Oct. 20, 1942.   W. J. EMMONS ET AL   2,299,717
SALT MEASURING AND DISPENSING MACHINE
Filed Dec. 11, 1939   3 Sheets-Sheet 1

INVENTORS
WILLIAM J. EMMONS
BERNARD S. GALLAGHER
BY
Oscar A. Mellin
ATTORNEY.

Oct. 20, 1942.  W. J. EMMONS ET AL  2,299,717
SALT MEASURING AND DISPENSING MACHINE
Filed Dec. 11, 1939  3 Sheets-Sheet 3

INVENTORS.
WILLIAM J. EMMONS
BERNARD S. GALLAGHER
BY
Oscar A. Mellin
ATTORNEY.

Patented Oct. 20, 1942

2,299,717

UNITED STATES PATENT OFFICE 2,299,717

SALT MEASURING AND DISPENSING MACHINE

William J. Emmons, Oakland, and Bernard S. Gallagher, Piedmont, Calif., assignors to Salter Machine Company, Oakland, Calif., a corporation of California Application December 11, 1939, Serial No. 308,570

23 Claims. (Cl. 226—99)

This invention relates to cannery equipment and particularly pertains to a machine for dispensing salt into cans filled or to be filled with food products.

It is the principal object of the present invention to provide an improved and highly efficient machine for automatically depositing a measured amount of granulated salt into each can as it passes through the machine, which machine is capable of efficient operation regardless of the degree of granular fineness of the salt.

In actual practice our improved machine includes a measuring disc rotatable in a horizontal plane by the cans engaging a can turret associated with the disc. The machine is so designed that it is capable of insertion in any location in the can stream as may be required by the nature of the canned product. The measuring disc has a series of concentrically arranged measuring apertures disposed so that one thereof will overlie each can engaging the turret. Arranged above the disc is a salt receiving hopper which supplies salt to a cup-like magazine which is mounted for universal movement, the bottom of which is spring-pressed against the top of the disc. The magazine has a port in its bottom with which the measuring apertures successively register. Below that port and spring-pressed upwardly against the bottom of the disc is a closure member, likewise free for universal movement. Therefore, as a can engages the turret, the latter is operated and moves the disc so that a measuring aperture above the can passes between the port and closure member and is filled with salt, and as it moves with the can out of register with the closure member, the salt in said aperture discharges into the can. Provision is made to maintain the salt in free running condition in the hopper and for keeping the measuring disc free of salt.

One form which the invention may assume is exemplified in the following description and illustrated by way of example in the accompanying drawings, in which.

Figure 1:
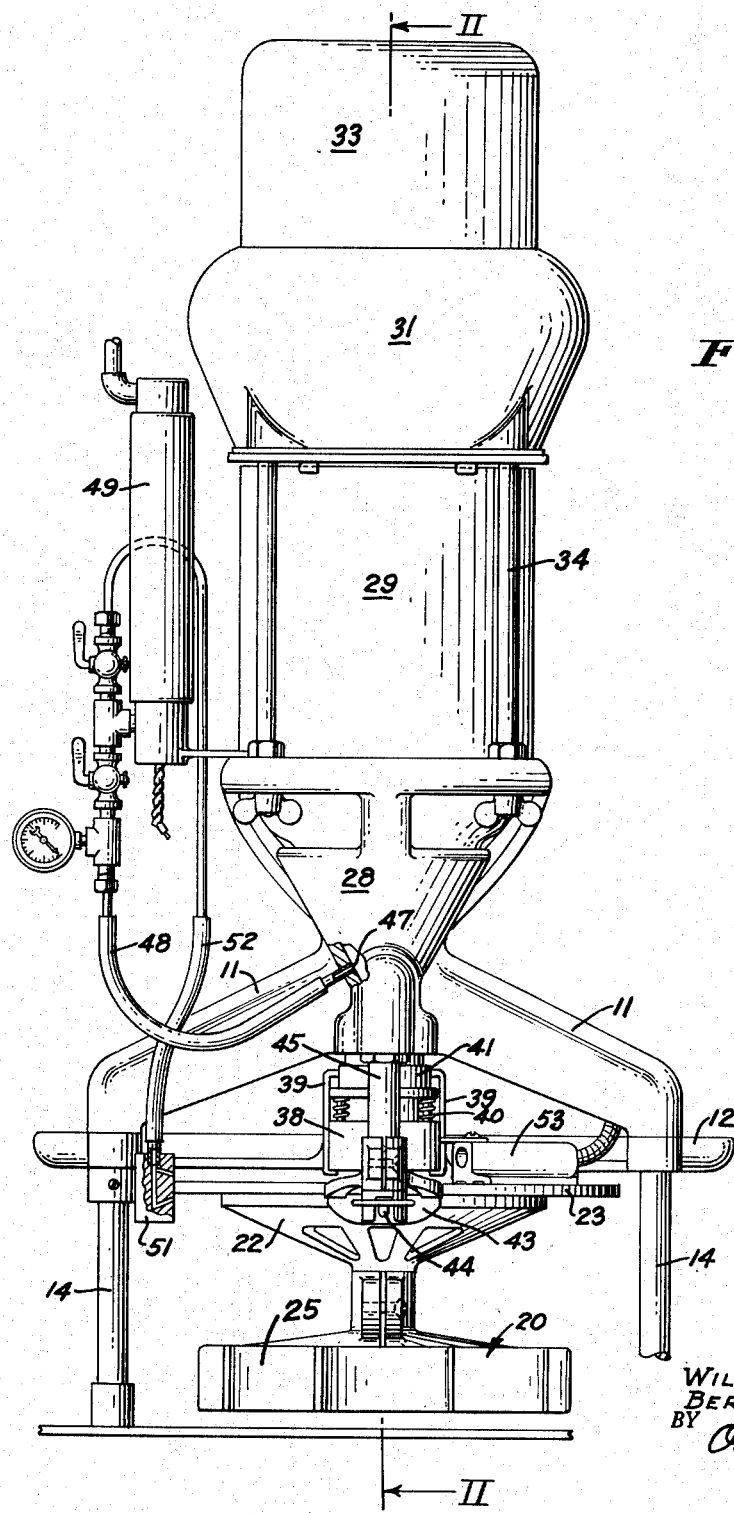
Fig. 1 is a front elevation of a machine embodying the preferred form of our invention.
Figure 2:
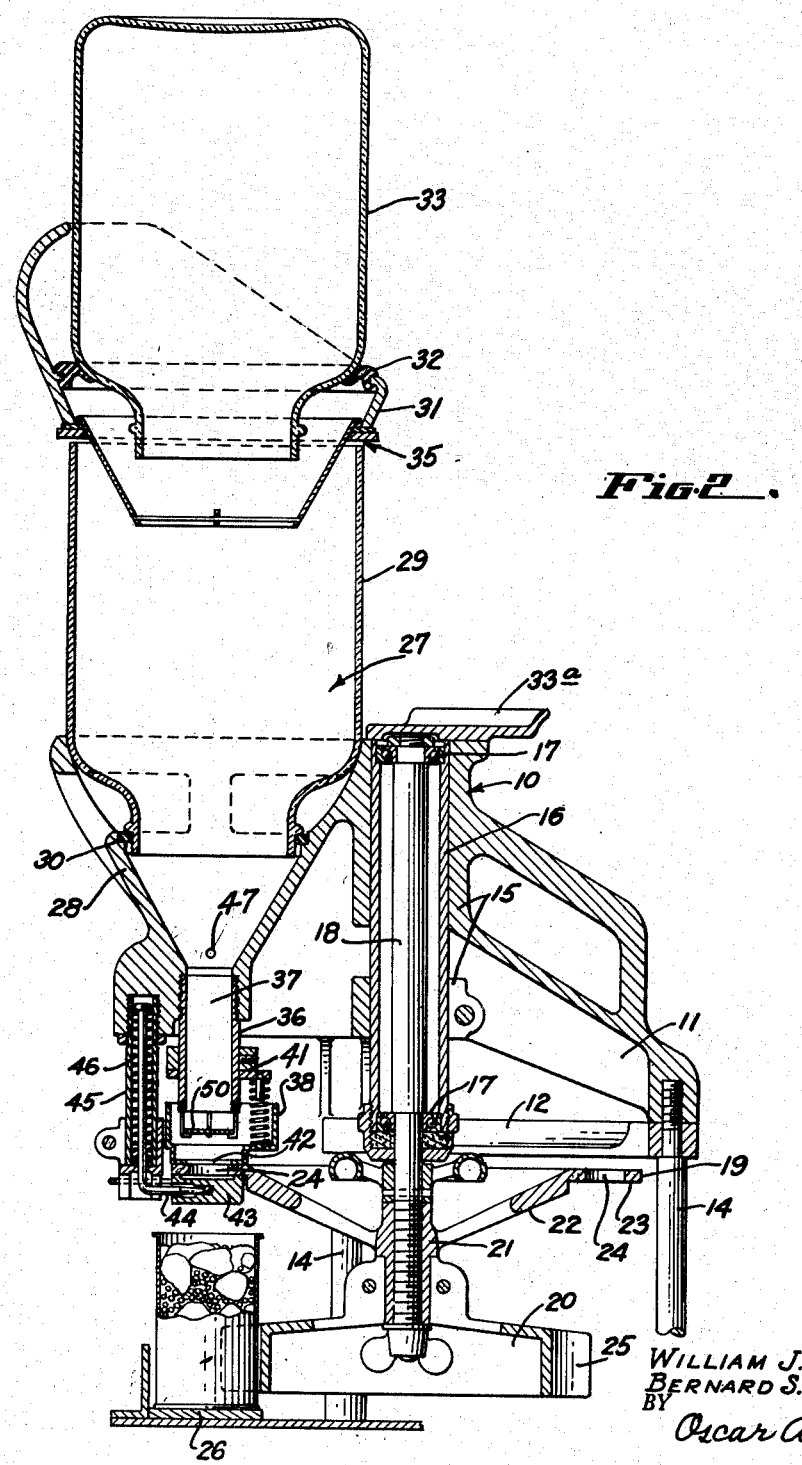
Fig. 2 is a central vertical section through the machine taken on line II—II of Fig. 1.

Referring more particularly to the accompanying drawings, we there illustrate a salt measuring and dispensing machine for use in canneries for automatically depositing a measured amount of salt in each of the filled cans, preferably as they pass to the can capping machine. We appreciate, however, that our machine has various other uses in connection with measuring and dispensing finely granulated material, and, of course, we do not limit ourselves to the precise use here described.

The machine is provided with a spider-like frame 10 of suitable construction, which frame has three radially projecting legs 11 to the bottom of which is fixed a horizontal frame plate 12 by means of vertical supporting standards 14. At the junction of the legs 11 and formed integrally therewith is a vertically extending bearing 15 receiving a fixed bushing 16 having at its opposite ends anti-friction bearings 17 which rotatably support a vertical spindle 18. It will be noticed that at the ends of the bushing 16 means are provided to prevent the granulated material from gaining access to the bearings.

Removably secured on the lower end of the spindle 18 and below the horizontal frame plate 12 is a measuring disc 19 and a can turret wheel 20 which are connected together so that the two will operate in timed relationship. It will be noticed that the mounting of the two members 19 and 20 on the spindle is such that they may be removed and replaced to accommodate cans of different sizes as desired.

The measuring disc 19 includes a hub 21 from which emanates a slightly cone-shaped web 22 carrying an annular flat ring 23 which lies in the plane of rotation. Formed through this ring between the inner and outer marginal edges thereof is a plurality of measuring apertures 24 which are arranged concentrically with respect to the axis of rotation and spaced equal distances apart circumferentially. The diameter and depth of these measuring apertures 24 is such that they will contain, when filled with salt, the desired measured quantity of salt to be deposited in each can as it passes through the machine.

The can turret wheel 20 has exactly the same number of can receiving pockets 25 as there are measuring apertures 24 and the center from which these pockets are scribed is in proper vertical alignment with the centers of the measuring apertures 24, so that when a can passes into the machine and nests into one of the pockets 25 of the can turret wheel 20, a measuring aperture 24 will be disposed substantially directly over the center of the can. However, the connection between the disc 19 and turret wheel 20 is such that they may be relatively adjusted circumferentially to suit the conditions met.

It is contemplated that cans will pass through the machine on a conveyor belt or the like, indicated by the numeral 26, in such proper relation with the can turret wheel 20 that the cans will successively engage a pocket of the can turret wheel 20 and revolve the same as they pass through the machine. Naturally, when a can is engaged in a pocket 25 of the can turret wheel 20, it will immediately become aligned with a salt measuring aperture 24 above in the measuring disc 19 so that when salt is discharged from the measuring aperture 24 downwardly, it will deposit in the aligned can below.

At one side of the frame is a salt receiving hopper, generally indicated by the numeral 27, which consists of a cone-shaped portion 28 formed as an integral part of the frame. The larger end of the cone is uppermost and is of a diameter to receive a cylindrical transparent shell 29, the smaller lower end of which is adapted to be removably inserted into the cone-shaped portion 28 with its shoulder engaging a gasket 30.

Rigidly supported above the upper end of the transparent shell 29 is a funnel 31 having an annular gasket 32 fixed at its upper end, into which funnel may be projected the lower end of a salt container 33 with its shoulder bearing on the gasket 32. The lower portion of the funnel 31 projects downwardly into the transparent shell 29 as is clearly indicated in the drawings. The funnel 31 is supported in a fixed position above the shell 29 by means of rigid spacer rods 34 fixed at their lower ends to the conical portion 28 of the hopper 27. There results a slight annular space 35 between the upper end of the shell 29 and the funnel 31 as indicated. Any other suitable container or reservoir may serve as a source of supply of salt in place of hopper 27.

Figure 4:
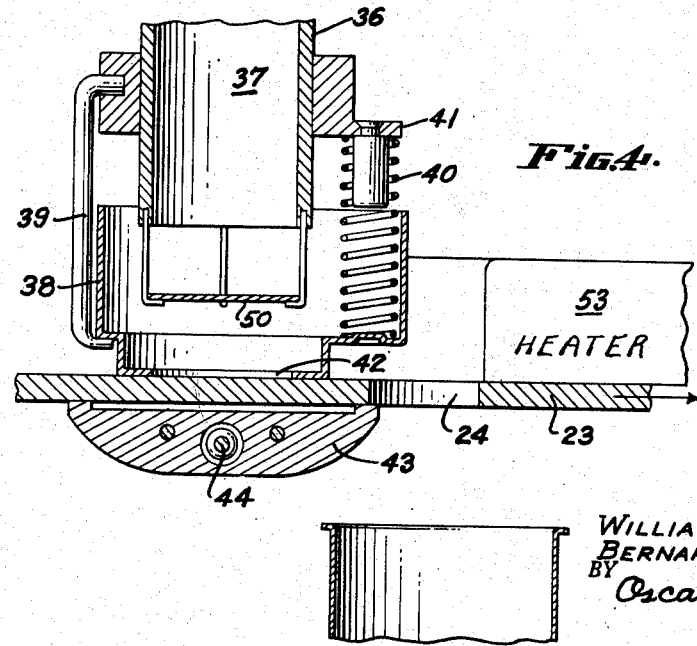
Fig. 4 is an enlarged fragmentary view in section showing the arrangement and mounting of the cup-like magazine and the retaining shoe with relation to the measuring disc.

The lower end of the cone portion 28 of the hopper 27 is provided with a discharge tube 36 forming a discharge throat or opening 37 extending downwardly from the lower end of the cone portion 28 of the hopper 27, so that salt in the hopper may discharge downwardly through the throat 37 into a cup-like receiving and dispensing magazine 38 disposed at the lower end of the tube 36. It is preferable that the throat or discharge opening 37 terminate a substantial distance above the measuring disc 19, as shown in Fig. 4. It should not be so close to disc 19 as to prevent a quantity of salt from accumulating in the magazine or hopper 38. Or, defined differently, opening 37 should be spaced above disc 19 by a distance greater than the grain size of the materials being dispensed, so that at no time is the lower end of tube 36 called upon to guide the material into the pockets 24 without depositing an excess on the disc 19.

It will be seen that this cup-like receiving and dispensing magazine 38 is floating in that it is free for universal floating movement. It is held from dislodgment in a direction circumferentially with respect to the measuring disc 19 by guide rods 39, and is yieldably urged downwardly with its flat bottom surface into sliding contact with the upper face of the ring portion 23 of the measuring disc 19 by means of three springs 40 which bear against the bottom of the magazine at one end and against a fixed collar 41 on the tube 36 at a spaced distance above the magazine 38 at the other end. In effect 38 is a secondary hopper which floatingly engages the measuring means and is kept filled to the proper level from hopper 27.

The upper end or opening in magazine 38 should be greater in area than the area of throat 37, as shown in Fig. 4, to avoid spillage of salt. The upper end of magazine 38 is shown in Fig. 4 as slightly above the level of discharge throat 37. The relative vertical relation of these parts may vary. There is no particular limit, except as a matter of design, on how much above the throat 37 opening the effective upper edge of the magazine 38 extends. There is, however, a necessity that this upper edge of 38 should not be too far below the level of the throat opening. This latter distance is determined by the point where the natural angle of repose of the comminuted material will pass below the upper rim of the magazine.

It is preferable that the upper end of magazine 38 be open to the atmosphere.

The bottom of the magazine 38 is of a width corresponding somewhat with the width of the ring 23 of the measuring disc 19, and it is formed with a discharge port 42 through which salt contained in the magazine may discharge into the measuring apertures 24, when the latter register therewith as the measuring disc 19 revolves. It should be stated that the center line of the throat 37 and the discharge port 42 of the magazine is the same radial distance from the center of the spindle 18 as the center of the measuring apertures 24 so that the latter will successively register with the discharge port 42 of the magazine as the measuring disc 19 revolves.

We prefer to term the point where the measuring apertures 24 register with the discharge port 42 of the magazine 38 the measuring station.

Below the ring 23 of the measuring disc 19 and in vertical alignment with the port 42 is what we prefer to term a retaining shoe 43 which is in effect a closure for the underside of the measuring apertures 24, when they are positioned at the measuring station. This shoe likewise is mounted for universal floating movement and yieldingly but slidably engages the underside of the ring 23. It is seen that it is mounted at one end of a right-angularly bent rod 44, the other end of which is received in a tube 45 in which a spring 46 is so arranged that it yieldingly retains the retaining shoe 43 in sliding contact with the underside of the ring 23 of the measuring disc 19. It is also apparent that by pulling the shoe 43 and the rod 44 downwardly against the action of the spring 46, the retaining shoe may be disengaged from the ring 23 and then swung about the axis of the rod 44 and be removed therefrom.

We desire to point out that both the magazine and the retaining shoe 43 are capable, to some extent, of universal movement so that their flat faces, which are in contact with the surfaces of the ring 23, will always conform to the said surfaces regardless of whether or not the measuring disc rotates in a true plane, thus always insuring against the escape of salt, regardless of its granular fineness, between the contacting surfaces of the ring 23, the magazine 38 and the retaining shoe 43. This is an important feature and to describe this ability of universal movement of both the magazine 38 and retaining shoe 43 to conform to the plane of the surfaces of the ring 23, we have herein defined the magazine and retaining shoe as being "floatingly mounted." This characteristic mounting of the magazine 38 and the retaining shoe 43, together with the fact that they are yieldingly pressed in sliding contact with the opposite surfaces of the ring 23 of the measuring disc 19, enables the measuring apertures 24 to be properly filled with salt at the measuring station and moved to the dispensing station without the escape of salt between the engaging surfaces of the measuring disc, the magazine 38 and the retaining shoe 43.

For the purpose of preventing clogging of the salt or other material in throat 37, we have provided a means for agitating the salt as it enters said throat. This means comprises an air nozzle 47 at the base of the conical portion 28 of the hopper just above the throat, which nozzle 47 is connected with a conduit 48 to a source of air under slight pressure, the air being slightly warmed by any suitable type of air heater 49 prior to being discharged into the conduit 48. The reason for the air heater 49 is to raise the temperature of the air so as to decrease the humidity. The point of relative humidity in handling such materials as salt, for example, is very vital. We have found that air at 80° to 90° F. will hold the moisture and not give it up to the salt, and that when the air temperature drops below this range, an excessive amount of moisture is taken up by the salt. To illustrate one form of our invention, we have illustrated an electrically warmed air heater 49 from which the compressed air passes through conduit 48 into the base of the hopper at nozzle 47. The warmed air from this heater also passes through the conduit 52 to the nozzles in element 51. We have found that by discharging a jet of air into the base of the hopper just above the throat 37, that the salt is maintained agitated to a sufficient degree to prevent it from bridging the throat 37 and clogging therein. However, to prevent this air pressure from forcing salt upwardly between the container 33 and the gasket 32, it is necessary to provide the air escape space 35, previously described, between the transparent shell 29 and the funnel 31. Also, when using air for agitating salt, to allow for the escape of the air and prevent the salt from flowing over the top edge of the cup-like magazine 38, we provide a baffle 50 which is spaced a distance below the bottom end of the tube 36 and limits or regulates the level of the salt in the magazine 38.

We also use the air pressure as a means of removing any salt granules or powder from the surfaces of the ring 23 of the measuring disc 19. This means includes a nozzle 51 constructed to direct air jets radially across both the upper and lower surfaces of the ring 23 of the measuring disc 19, which nozzle 51 may be connected by a conduit 52 to the same source of air under pressure as is connected with the conduit 48.

Because salt is highly hydroscopic, we preferably form the measuring disc and those parts in contact therewith of aluminum, or like material having a high heat conducting value, and provide an electrical heating element 53 in contact with or adjacent the disc 19 to maintain the same and its associate parts at a temperature so that they will remain dry and the salt will not adhere to the surfaces thereof.

Figure 3:
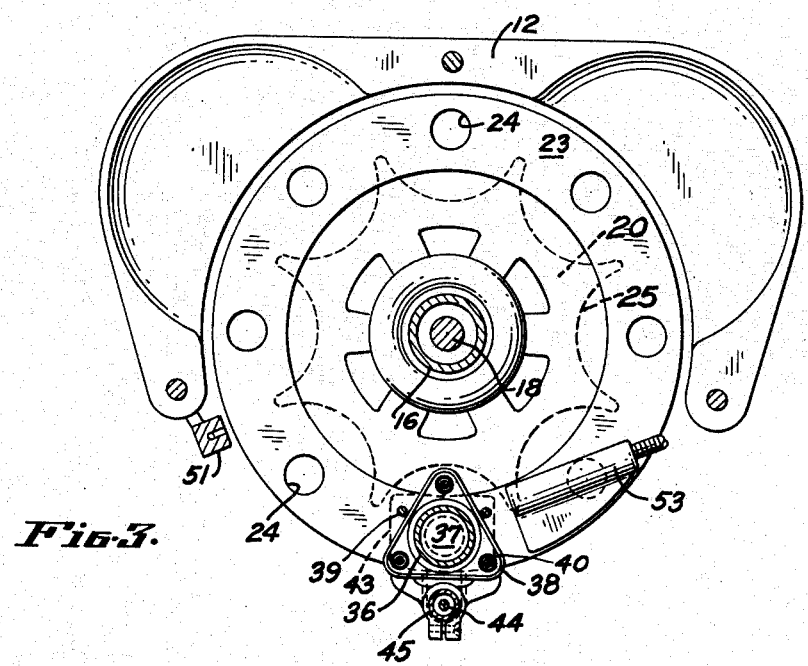
Fig. 3 is a plan section through the machine taken on line III—III of Fig. 2.

In operation of the device, it is usual practice in a cannery to provide a suitable number of salt containers such as illustrated by the numeral 33 filled with salt, and which containers are provided with tight caps or covers. In using the machine, the cover of the container 33 is removed and the container is inverted, as illustrated, and supported in the funnel 31, the cap being placed on a cap receiving member 33a provided on the frame of the machine just above the upper end of the spindle. The frame plate 12 is so formed, as illustrated in Fig. 3, that additional containers 33 of salt may be positioned thereon for ready access, when it is desired to recharge the hopper 27, and to support empty containers as they are removed from the machine.

Assuming that the hopper has received a charge of salt and that the conveyor 26 is conveying cans therealong, as a can engages a pocket 25 of the can turret wheel 20, the latter and the measuring disc 19 will rotate simultaneously, bringing the proper measuring aperture 24 to the measuring station in register with the discharge port 42 of the magazine 38. The bottom of the aperture being closed by the retaining shoe 43, the aperture will be filled with salt, and as the disc continues to rotate, the aperture will advance in timed relation with the can so that when the aperture becomes out of register with the retaining shoe 43, the salt contained in the aperture will fall therefrom and deposit into the can directly therebelow. Due to the fact that the magazine 38 and the retaining shoe 43 are floatingly mounted and yieldingly engage the opposite surfaces of the retaining disc, little, if any, salt will escape between those surfaces, and only the exact amount of salt required for depositing in the can will be conveyed by the measuring disc 19 from the measuring station to the dispensing station, which is at the point where the measuring aperture 24 becomes out of register with the retaining shoe 43.

Due to the fact that the material is kept agitated in the hopper by an air jet emanating from the air nozzle 47, no clogging of the salt will result therein, and the latter will flow freely through the throat into the magazine where it is prevented from overflowing by the provision of the baffle 50.

Likewise, due to the fact that the measuring and dispensing parts of the machine are of heat conducting material and the measuring disc is maintained dry by heat applied thereto by the electrical heating element, any salt which may accumulate on the disc will be removed therefrom by the air jets emanating from the air nozzle 51. The air discharged into the hopper and over the disc is heated air, as previously described.

From the foregoing it is obvious that we have provided a very simple and efficient salt measuring and dispensing machine which may be efficiently used in canneries for automatically depositing a measured amount of salt in each of the filled containers as they pass through the processing machinery.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. In a device of the character described, a hopper for containing granular material having a discharge opening, a measuring member below said discharge opening movable in a fixed path in a horizontal plane and having a granular material receiving measuring aperture formed therethrough, a magazine mounted for universal movement and floatingly supported in a position intermediate said discharge opening and measuring member and yieldably but slidably bearing on said member, said magazine to receive granular material from said hopper and having a port in its wall which engages the measuring member to discharge granular material into said measuring aperture when the same registers with said port, and a closure member mounted for universal movement and floatingly supported adjacent said measuring member and yieldably but slidably engaging the surface thereof opposite that engaged by the magazine and in vertical registry with the port thereof to close said measuring aperture when the latter registers with said port.

2. In a device of the nature disclosed, a rotary measuring disc having formed therethrough a plurality of concentrically arranged relatively spaced measuring apertures, a dispensing magazine mounted for universal movement and to yieldingly but slidably engage the upper surface of said disc at a fixed location defining a measuring station, means for supplying to said magazine a comminuted material to be dispensed, said magazine having a port formed in its disc engaging wall in alignment with the path of travel of said measuring apertures whereby the material discharged through said port will successively fill said apertures as the disc is rotated, and a closure member mounted for universal movement in alignment with said port and yieldingly but slidably engaging the under surface of said disc to form a temporary bottom for the measuring apertures as they pass said measuring station.

3. In a device of the nature disclosed, a rotary measuring disc having formed therethrough a plurality of concentrically arranged relatively spaced measuring apertures, a dispensing magazine mounted for universal movement and to yieldingly but slidably engage the upper surface of said disc at a fixed location defining a measuring station, means for supplying to said magazine a comminuted material to be dispensed, said magazine having a port formed in its disc engaging wall in alignment with the path of travel of said measuring apetrures whereby the material discharged through said port will successively fill said apertures as the disc is rotated, and a closure member mounted for universal movement in alignment with said port and yieldingly but slidably engaging the under surface of said disc to form a temporary bottom for the measuring apertures as they pass said measuring station, said closure member extending in the direction of travel of said measuring apertures to an unloading station to retain the measured material in said apertures for unloading therefrom as they pass the forward edge of the closure member.

4. In a device of the character described, a rotary measuring disc having formed therethrough a plurality of concentrically arranged relatively spaced measuring apertures, a hopper to receive salt and having at its lower end a discharge throat terminating in a discharge opening, a magazine positioned to receive salt from said discharge opening and floatingly supported above said measuring disc but yieldingly and slidably engaging the same, the said magazine having a port formed in the bottom thereof with which the measuring apertures register as said disc revolves, a retaining shoe floatingly mounted but yieldingly and slidably bearing against the opposite side of said measuring disc in alignment with the port of said magazine whereby upon rotation of the disc said apertures will successively align with said discharge port and be filled with salt and allow the same to discharge therefrom after passing said retaining shoe, and means for directing a jet of air radially across the upper and lower surfaces of said disc.

5. In a device of the character described, a rotary measuring disc having formed therethrough a plurality of concentrically arranged relatively spaced measuring apertures, a hopper to receive salt and having at its lower end a discharge throat terminating in a discharge opening, a magazine positioned to receive salt from said discharge opening and floatingly supported above said measuring disc but yieldingly and slidably engaging the same, the said magazine having a port formed in the bottom thereof with which the measuring apertures register as said disc revolves, a retaining shoe floatingly mounted but yieldingly and slidably bearing against the opposite side of said measuring disc in alignment with the port of said magazine whereby upon rotation of the disc said apertures will successively align with said discharge port and be filled with salt and allow the same to discharge therefrom after passing said retaining shoe, and a heating element adjacent said disc to transmit heat thereto.

6. A device of the character described comprising a measuring disc having a plurality of concentrically arranged relatively spaced measuring apertures formed therethrough and adapted to rotate in a horizontal plane, a salt receiving hopper mounted above said disc, a tube depending from the lower end of said hopper in a position where said apertures will register therewith as the disc is revolved, a cup-like member interposed between the tube and said disc and into which said tube projects, said cup-like member being mounted for universal movement and yieldingly pressed against the upper surface of said disc, the upper end of said cup-like member being open and of a diameter somewhat greater than the external diameter of said tube so as to provide an annular air escape space therebetween, said cup-like member having a discharge port formed in the wall thereof bearing on said disc and in substantial alignment with said tube, and a closure member arranged at the underside of the disc in alignment with the discharge port of said cup-like member and being mounted for universal movement and yieldingly pressed against the underside of said disc.

7. A device of the character described comprising a measuring disc having a plurality of concentrically arranged relatively spaced measuring apertures formed therethrough and adapted to rotate in a horizontal plane, a salt receiving hopper mounted above said disc, a tube depending from the lower end of said hopper in a position where said apertures will register therewith as the disc is revolved, a cup-like member interposed between the tube and said disc and into which said tube slightly projects, said cup-like member being mounted for universal movement and yieldingly pressed against the upper surface of said disc, said cup-like member having a discharge port formed in the wall thereof bearing on said disc and in substantial alignment with said tube, an air nozzle in the base of said hopper at the upper end of said tube to agitate salt as it enters said tube, a baffle member arranged within said cup-like member above the bottom thereof but spaced from the lower end of said tube, and retaining means disposed below the disc and mounted for universal movement and yieldingly pressed against the bottom of the disc in register with the discharge port of said cup-like member.

8. A device of the character described comprising a measuring disc having a plurality of concentrically arranged relatively spaced measuring apertures formed therethrough and adapted to rotate in a horizontal plane, a salt receiving hopper mounted above said disc, a tube depending from the lower end of said hopper in a position where said apertures will register therewith as the disc is revolved, a cup-like member interposed between the tube and said disc and into which said tube slightly projects, said cup-like member being mounted for universal movement and yieldingly pressed against the upper surface of said disc, said cup-like member having a discharge port formed in the wall thereof bearing on said disc and in substantial alignment with said tube, an air nozzle in the base of said hopper at the upper end of said tube to agitate salt as it enters said tube, a baffle member arranged within said cup-like member above the bottom thereof but spaced from the lower end of said tube, a retaining shoe disposed below the disc and mounted for universal movement and yieldingly pressed against the bottom of the disc in register with the discharge port of said cup-like member, a heating element for transmitting heat to said disc, and means for impinging jets of air on the surfaces of said disc.

9. In a device of the character described, a movable measuring means, having provision for releasing its contents, a hopper for dispensing comminuted material, having a discharge opening, and a receiving and dispensing magazine adjacent said discharge opening, said magazine having its upper end larger than the discharge opening and being open to the atmosphere and its lower end slidably engaging said movable measuring means, said discharge opening being spaced a substantial distance above said measuring means.

10. In a device of the character described, a movable measuring means, having provision for releasing its contents, a hopper for dispensing comminuted material, having a discharge opening, and a receiving and dispensing magazine adjacent said discharge opening, said magazine having its upper end larger than the discharge opening and being open to the atmosphere and its lower end slidably engaging said movable measuring means, said discharge opening extending adjacent the upper end of said receiving magazine to a point where the natural angle of repose of the comminuted material will pass below the upper rim of said magazine.

11. In a device of the character described, a rotary movable measuring disc having formed therethrough a plurality of concentrically arranged relatively spaced measuring apertures, a hopper for dispensing comminuted material, having a discharge opening, and a receiving and dispensing magazine adjacent said discharge opening, said magazine having its upper end larger than the discharge opening and being open to the atmosphere and its lower end slidably engaging said movable measuring disc, said discharge opening being spaced a substantial distance above said measuring disc and means for selectively closing and opening said measuring apertures.

12. In a device of the character described, a movable measuring means, having provision for releasing its contents, a hopper for dispensing comminuted material, having a discharge opening, and a receiving and dispensing magazine adjacent said discharge opening, said magazine having its upper end larger than the discharge opening and being open to the atmosphere and its lower end slidably engaging said movable measuring means, said discharge opening being spaced a substantial distance above said measuring means, and a heating element in close juxtaposition with said measuring means to transmit heat thereto.

13. In a device of the character described, a measuring means, having provision for releasing its contents, a hopper for dispensing comminuted material, having a discharge opening, an air nozzle in the base of said hopper to agitate the comminuted material as it enters the discharge opening, and a receiving and dispensing magazine adjacent said discharge opening, said magazine having its upper end larger than the discharge opening and being open to the atmosphere and its lower end slidably engaging said measuring means, said discharge opening being spaced a substantial distance above said measuring means.

14. In a device of the character described, a measuring means, having provision for releasing its contents, a hopper for dispensing comminuted material, having a discharge opening, an air nozzle in the base of said hopper to agitate the comminuted material as it enters the discharge opening, means for regulating the moisture content of said air, and a receiving and dispensing magazine adjacent said discharge opening, said magazine having its upper end larger than the discharge opening and being open to the atmosphere and its lower end slidably engaging said measuring means, said discharge opening being spaced a substantial distance above said measuring means.

15. In a device of the character described, a measuring means, having provision for releasing its contents, a hopper for dispensing comminuted material, having a discharge opening, and a receiving and dispensing magazine adjacent said discharge opening, said magazine having its upper end larger than the discharge opening and being open to the atmosphere and its lower end slidably engaging said measuring means, said discharge opening being spaced a substantial distance above said measuring means, and a baffle member arranged within said receiving magazine above the bottom thereof but spaced from the discharge opening.

16. In a device of the character described, a measuring means having provision for releasing its contents, a hopper for dispensing comminuted material, having a discharge opening, an air nozzle in the base of said hopper opening to agitate the comminuted material as it enters the discharge opening, and a receiving and dispensing magazine adjacent said discharge opening, said magazine having its upper end larger than the discharge opening and being open to the atmosphere and its lower end slidably engaging said measuring means, said discharge opening being spaced a substantial distance above said measuring means, and a baffle member arranged within said receiving magazine above the bottom thereof but spaced from the discharge opening.

17. In a device of the character described, a measuring means, having provision for releasing its contents, a hopper for dispensing comminuted material, having a discharge opening, and a receiving and dispensing magazine adjacent said discharge opening, said magazine having its upper end larger than the discharge opening and being open to the atmosphere and its lower end slidably engaging said measuring means, said discharge opening being spaced a substantial distance above said measuring means, and means for directing a jet of air radially across the surface of said measuring means.

18. In a device of the character described, a hopper for containing granular material having a discharge opening, a measuring member below said discharge opening movable in a fixed path in a horizontal plane and having a granular material receiving measuring aperture formed therethrough, a magazine mounted for universal movement and floatingly supported in a position intermediate said discharge opening and measuring member and yieldably but slidably bearing on said member, said magazine to receive granular material from said hopper and having a port in its wall which engages the measuring member to discharge granular material into said measuring aperture when the same registers with said port, and a closure member mounted for universal movement and floatingly supported adjacent said measuring member to close said measuring aperture when the latter registers with said port.

19. In a device of the nature disclosed, a rotary measuring disc having formed therethrough a plurality of concentrically arranged relatively spaced measuring apertures, a dispensing magazine mounted for universal movement and to yieldingly but slidably engage the upper surface of said disc, means for supplying to said magazine a comminuted material to be dispensed, said magazine having a port formed in its disc engaging wall in alignment with the path of travel of said measuring apertures whereby the material discharged through said port will successively fill said apertures as the disc is rotated, and a closure member to form a bottom for the measuring apertures as they pass.

20. In a device of the character described, a rotary measuring disc having formed therethrough a plurality of concentrically arranged relatively spaced measuring apertures, a hopper to receive salt and having at its lower end a discharge throat terminating in a discharge opening, a magazine positioned to receive salt from said discharge opening and floatingly supported above said measuring disc but yieldingly and slidably engaging the same, the said magazine having a port formed in the bottom thereof with which the measuring apertures register as said disc revolves, closure means yieldingly bearing against the opposite side of said measuring disc, means for directing a jet of air radially across the upper and lower surfaces of said disc.

21. A device of the character described comprising a measuring disc having a plurality of concentrically arranged relatively spaced measuring apertures formed therethrough and adapted to rotate in a horizontal plane, a salt receiving hopper mounted above said disc, a tube depending from the lower end of said hopper in a position where said apertures will register therewith as the disc is revolved, a cup-like member interposed between the tube and said disc and into which said tube projects, said cup-like member being mounted for universal movement and yieldingly pressed against the upper surface of said disc, the upper end of said cup-like member being open and of an area somewhat greater than the external diameter of said tube so as to provide an annular air escape space therebetween, said cup-like member having a discharge port formed in the wall thereof bearing on said disc and in substantial alignment with said tube, a closure member arranged at the underside of the disc in alignment with the discharge port of said cup-like member and being mounted for universal movement and yieldingly pressed against the underside of said disc.

22. In a device of the character described, a measuring means, having provision for releasing its contents, a hopper for comminuted material, having a discharge opening, and a receiving and dispensing magazine adjacent said discharge opening in lateral spaced relation thereto and its lower end slidably engaging said measuring means, and said discharge opening being spaced a substantial distance above said measuring means.

23. In a device of the character described, a measuring means, having provision for releasing its contents, a hopper for dispensing comminuted material, having a discharge opening, and a receiving and dispensing magazine adjacent said discharge opening, said magazine being materially greater in diameter than the diameter of said discharge opening for substantially its vertical extent so as to surround said discharge opening in spaced relation thereto, whereby free flowing of the contents from the discharge opening into said hopper at uniform pressure is provided on each operation of said measuring means, the lower end of said magazine slidably engaging said measuring means, and said discharge opening being spaced a substantial distance above said measuring means.

WILLIAM J. EMMONS.
BERNARD S. GALLAGHER.